Feb. 21, 1967    E. H. MUMFORD    3,305,341
TIMING SYSTEM FOR I.S. TYPE GLASSWARE FORMING MACHINE
Filed July 26, 1963    3 Sheets-Sheet 1
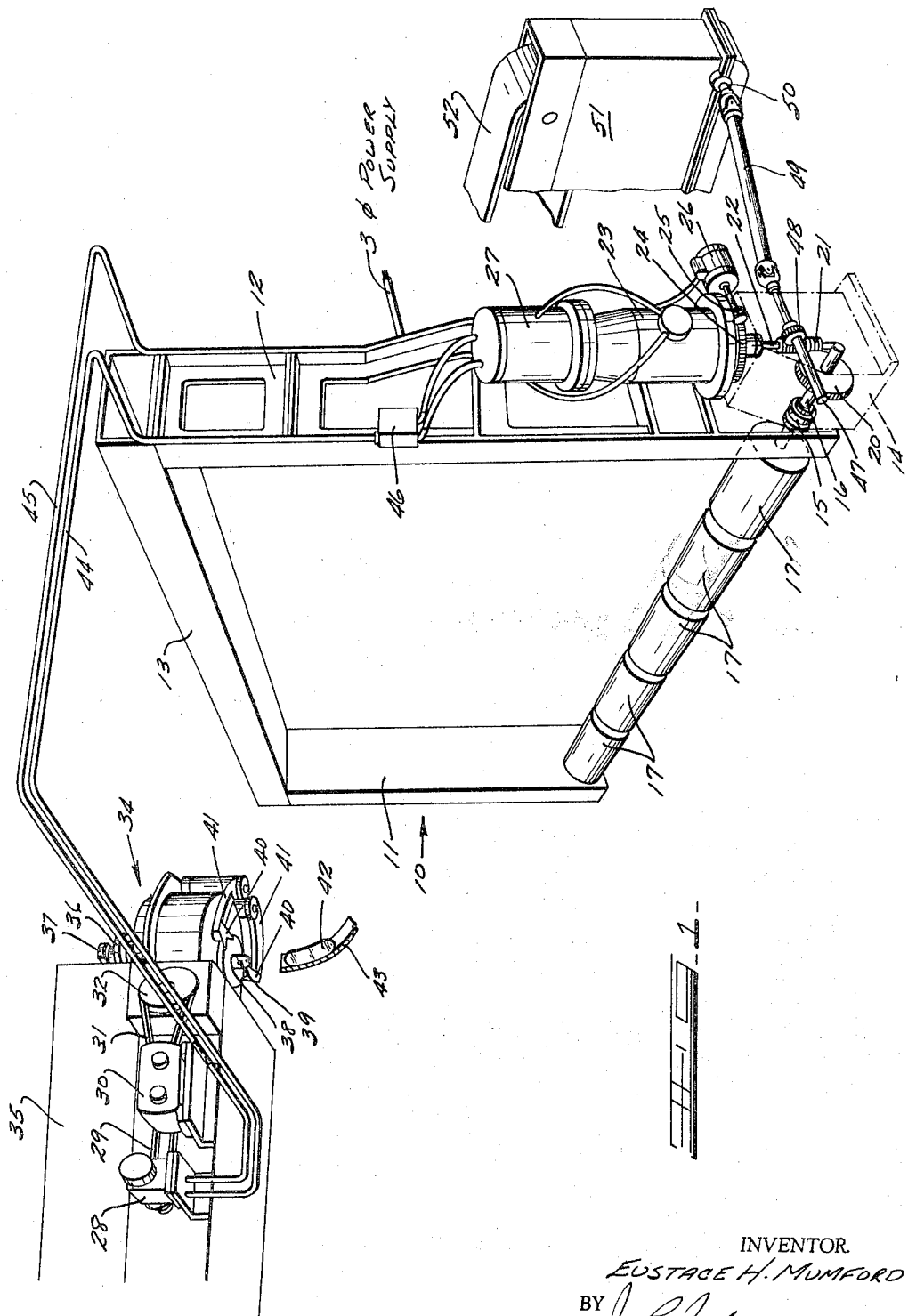
INVENTOR.
EUSTACE H. MUMFORD
BY J. R. Nelson
and W. A. Schaich
ATTORNEYS

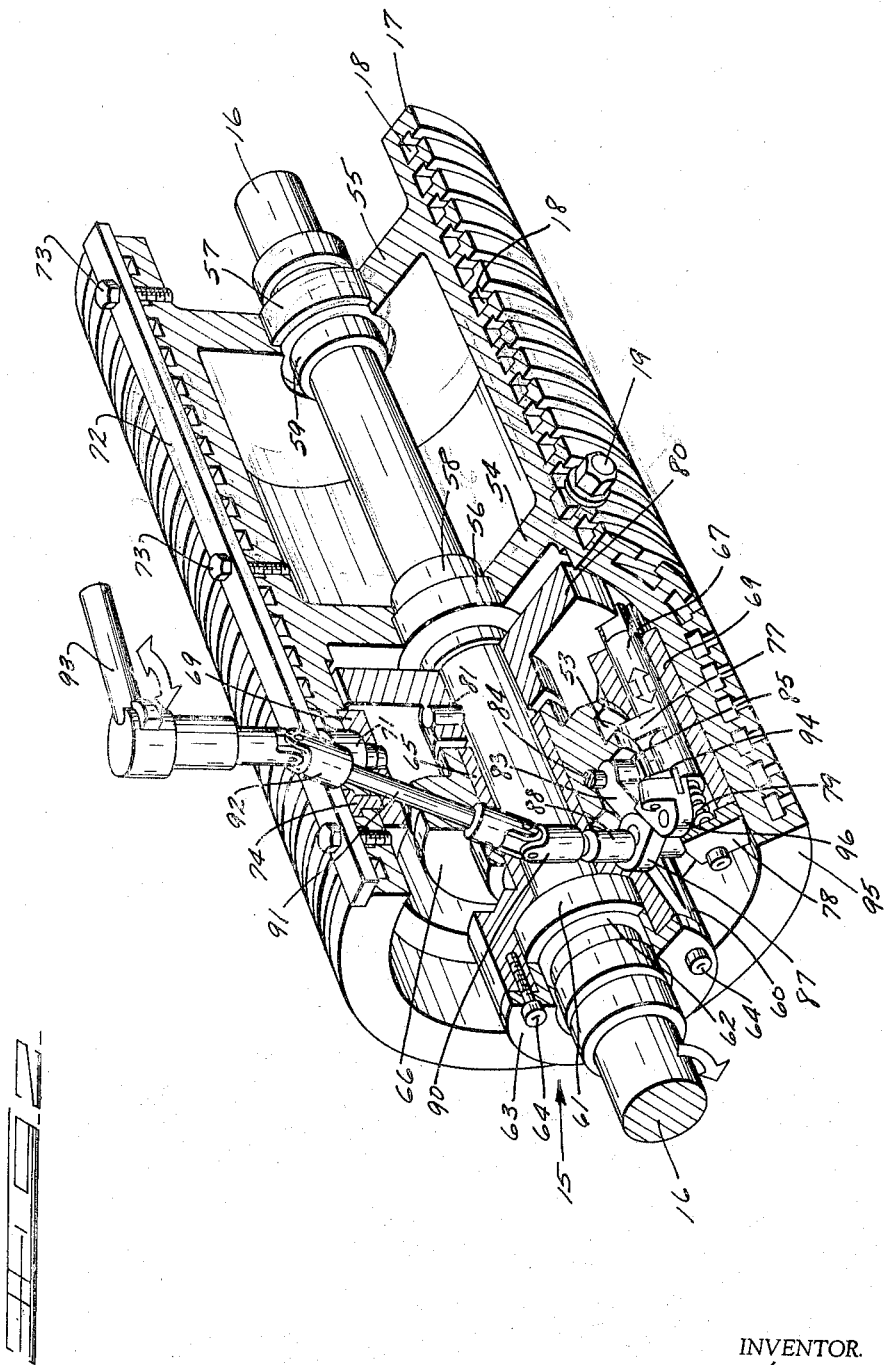

Feb. 21, 1967  E. H. MUMFORD  3,305,341
TIMING SYSTEM FOR I.S. TYPE GLASSWARE FORMING MACHINE
Filed July 26, 1963  3 Sheets-Sheet 3
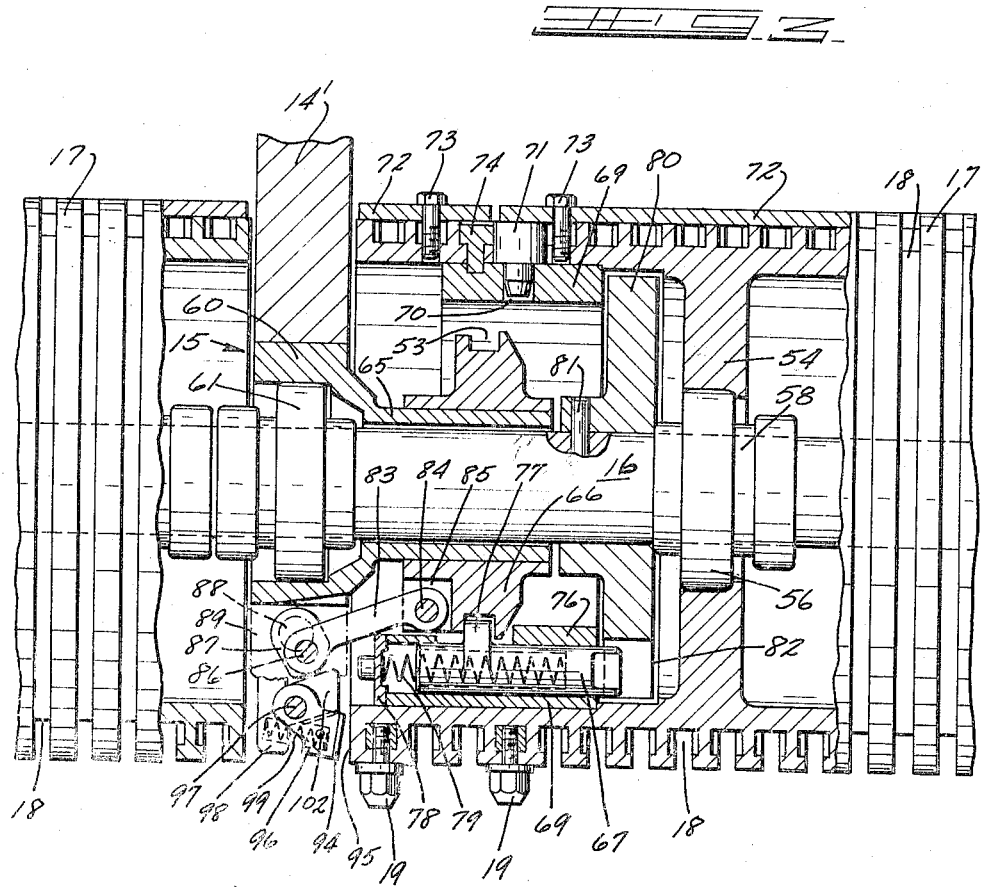
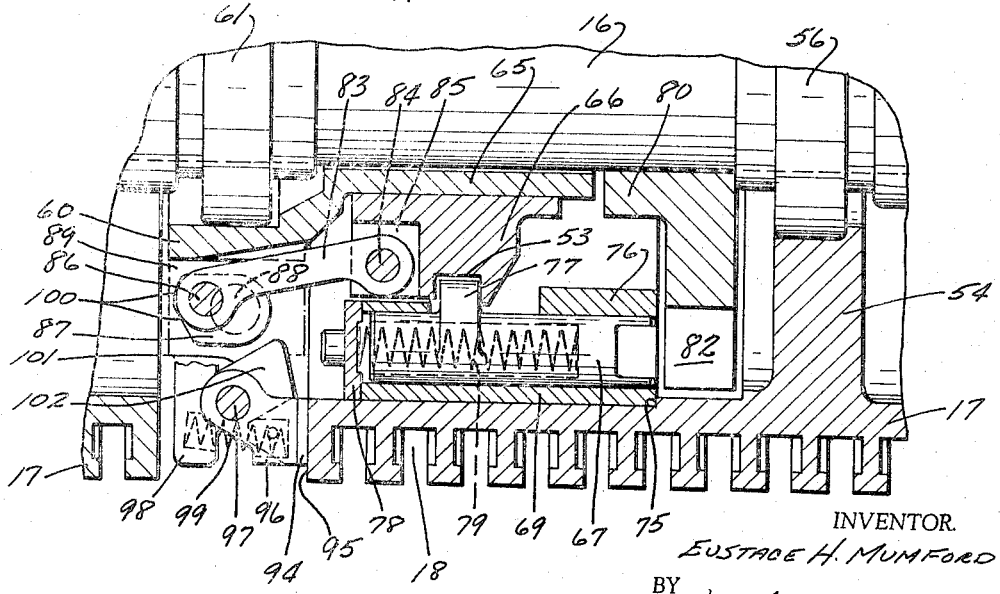
INVENTOR.
EUSTACE H. MUMFORD
BY
ATTORNEYS

United States Patent Office 3,305,341
Patented Feb. 21, 1967

3,305,341
TIMING SYSTEM FOR I.S. TYPE GLASSWARE FORMING MACHINE
Eustace H. Mumford, Ottawa Lake, Mich., assignor to Owens-Illinois, Inc., a corporation of Ohio
Filed July 26, 1963, Ser. No. 297,871
12 Claims. (Cl. 65—158)

This invention relates to glass forming apparatus wherein glass in a molten and flowable state is fed from a forehearth into a feeder apparatus and by controlled means the glass flows from the feeder through an orifice in the form of a stream. This stream is intermittently accelerated and retarded to emit charges of glass that are severed from the streams at intervals in the form of gobs of predetermined size, shape and weight of the glass. These gobs are conveyed into the glass forming machine sequentially and there formed by known means and manipulations to an article of glassware.

It is an object of the present invention to provide an improved timing system for synchronizing control of the feeder and the glass forming machine which is easily and readily maintained, has increased versatility and is readily adjustable.

Another object of the invention is to provide an improved timing drum mechanism of the glassware forming machine that operates with a minimum of error (backlash), has a minimum of wearing parts and is of such construction and arrangement on the glassware forming machine that it is capable of more accurate synchronized operation of the feeder and the machine, and, in a multiple section glassware forming machine, the sections are capable of more accurate relation to the other drums of the machine.

The foregoing objectives are achieved in the invention by providing an electrical synchrotie drive system for driving the feeder and the timing drums of the forming machine. Heretofore the feeder and machine were synchronously connected for cooperating operation by mechanical drive connections. An example of the prior art timing system is best shown on FIGS. 1 and 10 of U.S. Patent No. 1,911,119 to Ingle.

In the practical operation of the glass forming machine, such as the type shown in the Ingle patent, it is frequently necessary for various reasons to stop the timing drum of the machine (i.e. stop the machine). If the feeder is also stopped for any appreciable length of time, the glass undergoes a thermal change such that when again started the gobs formed are not of proper size, viscosity and are chilled. It thus is more appropriate to keep the feeder operating during such shut down periods.

The present invention provides practical means for keeping the gob feeder in operation while the machine or any section of it is temporarily stopped. This is accomplished by an electrical synchronous system and provision of improved timing drum mechanism enabling accurate phasing of the machine section with the feeder at starting or restarting.

Another important object of the invention is the provision of a novel timing drum construction and drive therefor on a multiple section glassware forming machine.

A further object of the invention is the provision of new and unique timing drums for a multiple section glassware forming machine freely rotatable on a driven shaft of the machine, each of the drums including a clutch-brake mechanism that engages the drum on the shaft in proper phase relation with the feeder supplying gobs of glass to the machine and eliminating backlash and reducing wearing parts to a minimum.

A still further object of the invention is to provide a novel synchronous drive transmission for the timing drum shaft synchronized with the gob feeder and having auxiliary drives for simultaneously synchronously operating auxiliary assemblies of the forming machine such as flight conveyor, lehr loader, etc.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

On the drawings:

FIG. 1 is a perspective view that is to some extent schematic showing the necessary parts of the gob feeder, glassware forming machine and one auxiliary assembly on the machine, in this case, the flight conveyor utilizing the new synchronous timing system of the invention;

FIG. 2 is a perspective, partly cut away, view of one timing of the present invention as employed on the multiple section glassware forming machine illustrated by FIG. 1;

FIG. 3 is a sectional elevational view showing in part two of the glassware machine timing drums of the invention mounted on the machine timing shaft which carries all the timing drums of the multiple section machine; and FIG. 4 is an enlarged, detailed partial sectional elevational view of a timing drum of FIG. 3 illustrating the novel clutch-brake system of the invention.

With reference to FIG. 1, the frame 10 of a glassware forming machine, such as the known I.S. (individual section) machine is comprised of vertical end supports 11 and 12 and a joining overhead beam 13. Along the base of support 12 is a transmission housing 14 (shown in phantom outline) which rests on the floor of the factory. This housing includes bearings, one of which is shown at 15, that provide a journal mounting for timing shaft 16. Shaft 16 extends the length of the machine and rotatably supports a plurality of machine section timing drums 17 (in this illustration 5, but in actual practice the machine may have from one section to as many as 6 as presently constructed). As is more completely described in the above-mentioned Ingle patent, these drums have a plurality of axially spaced peripheral grooves 18 which receive timing buttons 19 (see FIGS. 2 and 3). In each of the grooves there are provided a "long" button 19 and a "short" button. These sequentially engage a poppet valve latch (illustrated on FIG. 5 of the Ingle patent) and operate the valve "on" and "off" in controlling one or more fluid motors of the machine. The "short" button is rotationally ahead of the other button in a groove 18 of the drum and turns the valve "on" at a preselected time of each revolution of the drum 17. The "long" button 19 turns the valve "off" at a preselected later time. For each revolution of the drum 17, the valve will be operated at least once to perform a function on the glassware machine. The "timing" of each function in the cycle can be changed by adjusting the buttons 19 peripherally of the drum grooves 18.

The timing shaft 16 has keyed on it a pinion 20 in mesh with worm gear 21. The worm 21 is on the output shaft 22 of the motor 23. Shaft 22 transmits power of the receiver motor 23. The stator windings of motor 23 are rotatable with ring gear 24 when driven by a worm 25 on the shaft of a small Selsyn motor 26. Motor 26 is reversible and under manual control. The relation of the output shaft 22 to the input drive shaft of the feeder pulley 32 may be changed by rotation of the ring gear 24, as will presently be apparent. The slip ring assembly 27 permits the stator of motor 23 to rotate. The motor 23 is the receiver motor of a two motor set of A.C. duplicate wound-rotor induction motors having their stators connected to a three phase power supply and their rotors connected together. The other motor 28 is tied mechanically, such as belt 29, to be driven by a main motor 30 at a speed corresponding to the speed necessary for suitable gob formation. Motor 30 is mechanically connected by belt 31 to a pulley 32 of the feeder transmission unit 33. This transmission unit is conventional on the feeder 34 at the end of a glass furnace forehearth 35. The feeder has a mechanical connection with transmission 33 for operating a rotational tube 36 and a vertically reciprocating plunger or needle 37. The function of these parts on a gob feeder are well known. An orfiice 38 in the bottom of the feeder issues the glass as a sequentially, intermittently accelerated-decelerated stream 39 which is severed at regular intervals by the pair of horizontally reciprocating shears 40 rocked into and away from the stream on the shear arms 41.

The glass as it is severed is formed into discrete gobs 42 which are received in a series of gob guide chutes, one being illustrated at 43. The chutes 43 are individual to each section of the machine and are timed by the particular section timing drum 17 to intercept gobs from the feeder 34 and convey them to the blank molds (not shown) of the machine.

The motors 23 and 28 have their rotors electrically connected by conductors contained in the conduit 44. The stators of motors are each connected to a three-phase power supply. The motor 28 is driven by the main motor 30 at the desired "synchronous" speed. Motor 28 is the "transmitter" motor of a synchrotie system and motor 23 is the "receiver" motor of such a system. With the motors thus connected, any rotation of the rotor of motor 28 causes an exact and equal rotation of motor 23 or vice versa. Thus, the feeder and timing shaft are coupled together electrically for exact, synchronous rotations. Their positions or phasing are identical at all times as well as speed, and backlash or deviations in the system are minimized. The two motors may be disconnected electrically by a switch or relay such as illustrated at box 46. The phase relationship (instantaneous rotational position) of feeder 34 and timing shaft 16 may be adjusted by the ring gear 24, as described.

An auxiliary drive is also shown on FIG. 1. Horizontal shaft 47 journaled in the housing 14 has a pinion 48 that meshes with driver worm 21. Shaft 47 has a universal rod 49 connected to shaft 50 of the machine flight conveyor unit 51. The belt 52 of this unit receives the glassware that is formed and delivered from the glassware machine sections. This conveyor is thus synchronized in speed with the production output of the machine sections.

Referring now to FIGS. 2–4, the novel construction of the timing drum units 17 will be evident from the following description.

The timing drum 17 is a cylindrical hollow casting that has internal webs 54 and 55 which house the outer races 56 and 57, respectively, for the ball bearings 58 and 59. Bearings 58 and 59 are press fitted on the timing shaft 16, described earlier. One of the line bearings 15 for shaft 16 is comprised of a journal casting 60 that receives the outer race 61 of the bearing 15. A ball bearing 62 is press fitted on shaft 16. The bearing 62 is retained in place in the casting 60 by the keeper ring 63 fastened by studs 64 onto the casting 60. As seen on FIG. 3, the casting 60 is attached to a stationary bracket mounting 14' along the shaft (there is one between each adjacent pair of drums 17), and shaft 16 is thereby rotatably mounted in the plural bearings 15. By the bearings 58 and 59, each of the drums are freely rotatable on the shaft 16.

Integral with casting 60 is the sleeve 65 which fits loosely, concentrically about shaft 16 and is an axial slide guide for the throw-out hub 66. Hub 66 is not a rotatable member and has an annular groove 53 formed at its outer periphery. Outwardly of groove 53 is the axially shiftable pin 67 mounted as follows. Internally of drum 17 is a ring 69 rotatable inside the drum. Ring 69 has a notch or slot 70 which receives a plug 71. The plug 71 is peripherally adjustable in a slot around drum 17. The plug 71 is retained in a desired peripheral or angular position on drum 17 by the keeper bars 72 fastened to the drum by studs 73. Ring 69 is retained in axial position in the drum by key 74 holding the ring against a shoulder 75 milled in the drum. Key 74 fits around plug 71. As seen on FIG. 3, diametrically opposite slot 70 is the retaining slide 76 for pin 67. The pin has an inwardly facing lug 77 that rides in groove 53 when the drum 17 rotates. The slide 76 has an end plate 78 fastened thereon which retains spring 79 and compresses it against pin 67. The pin is hollow for receiving and retaining a length of the spring. Thus, the pin 67 is normally urged away from end plate 78. Opposite the end plate is a flywheel 80 fastened for rotation with shaft 16 by pin 81. Flywheel 80 has a single slot 82 that is in radial registry with pin 67. Pin 67 is shown in alternate positions with respect to slot 82 on FIGS. 3 and 4, FIG. 3 showing the pin engaged in slot 82 and FIG. 4 showing these two members disengaged.

There is provided a clutch-brake means for shifting the pin 67 by its lug 71 toward and away from slot 82. Actually, spring 79 normally urges the pin toward the engaged position. The clutch brake unit has a bell-crank linkage member 83 pin connected at 84 on one end to a recessed yoke 85 in hub 66. The other end of linkage 83 is pivoted on pin 86 on eccentric crank 87 mounted on rock shaft 88 rotatably mounted in the lower bracket 89 (shown in phantom outline for simplicity of illustration) of the bearing casting 60. As shown more or less schematically on FIG. 2, the rock shaft 88 has a universal joint connection 90 with a rod 91, and rod 91 has a universal joint connection 92 with operating lever or handle 93. Counterclockwise rotation of handle 93 (FIG. 2) rotates eccentric 87 counterclockwise and lengthens the reach of linkage 83 toward flywheel 82. This shifts hub 66 in that direction and causes pin 67 to move toward the flywheel. Since the flywheel 80 is rotating (see arrow on shaft 16, FIG. 2) and drum 17 carrying pin 67 is at rest, the nose of pin 67 will bear against the near face of the flywheel until the pin finds slot 82. At that point the two engage and the flywheel is coupled to the drum which causes the latter to turn with shaft 16. The nose of pin 67 is tapered, as is shown and therefore engagement of the pin in the slot is relatively smooth and gradual in engaging the drive for the drum.

By rotating handle 93 in the opposite direction, i.e. clockwise, the converse action takes place. The drum is uncoupled from the shaft 16 by the reach of linkage 83 being shortened. This draws the hub 66 away from the flywheel retracting pin 67 from engagement with slot 82.

Since the timing drum 17 assembly is of considerable mass, its inertia of rotation will tend to cause it to rotate uncontrollably after the pin and slot are disengaged. The invention also provides an automatically operated brake. The pin drive linkage includes with it a means connected to operate a brake shoe 94 into and out of engagement with a radial face 95 of the drum. This means comprises a brake member 96 pivoted at pin 97 on a lower yoke 98 attached to the casting 60. Yoke 98 is recessed to house a spring 99 which is compressed against a back recess in brake member 96. Spring 99 normally urges brake shoe 94 onto face 95 of the drum and is of sufficient compression to maintain the brake set (position of FIG. 4). The brake is automatically operated by the cam face 100 on the outer edge of the eccentric 87 which engages the cooperating cam face 101 on the upper side of an integral lug 102 of brake 96.

In operation, the handle 93 needs about 120° of rotation for full operation. If, for example, the drum 17 of a particular machine section is at rest, the shaft 16 being continuously driven, and it is desired to start the machine section into synchronized operation with the feeder and the other sections of the machine, handle 93 is turned counterclockwise. Eccentric 87 will then rotate counterclockwise from the position shown on FIG. 4. During about the first 90° of travel of the eccentric pin 67 will be advanced toward the flywheel sufficiently to engage its near face, but brake 94 will remain in the "on" position, as shown, held by spring 99. But, in the last 30° of rotation of eccentric 87 its cam face 100 will engage the cam face 101 on lug 102 and progressively rotate brake cam 96 clockwise to the position shown on FIG. 3. This will release the brake at the same time as the pin enters slot 82 of the flywheel. The drum is then engaged on shaft 16 and rotated at the synchronous speed.

In the apparatus described, the proper sequence of machine section timing valve operation may be set by individual adjustment of the valve operating buttons 19. The entire sequence of the machine section may be advanced or retarded by adjusting the peripheral position of the ring 69 in drum 17, thereby either advancing or retarding the slot 82 with respect to all the buttons 19 located in the slots 18 of the drum. This latter adjustment is called "phasing" of one machine section with respect to the others and/or with respect to the feeder.

Another timing adjustment for phasing all of the sections of the machine with respect to the feeder is obtained through adjustment of the differential drive at ring gear 24, FIG. 1. This advances or retards all of the drums 17 with respect to the feeder.

And, finally, but just as important, the feeder and machine sections are synchronized through their drives utilizing the transmitter motor 28 and receiver motor 27 of the synchrotie system.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. A multiple section glass forming machine including a timing mechanism for operating each section of said machine, comprising a single drive shaft, means for rotatably mounting said shaft, plural timing drums rotatably mounted side-by-side on said shaft, there being one of said drums for each section of said machine, an electric drive motor, drive means connected to the shaft and said drive motor for rotating the shaft at a predetermined speed, a clutch-brake unit individual to each said drum comprising a stationary bracket, a hub member, means for slidably mounting said hub member concentrically on said shaft for axial movement thereon, a flywheel secured on said shaft and including a radial slot therein, a pin adapted to engage said slot, means attaching said pin in a preselected angular position on its said drum, said means providing for axial sliding movement thereon toward and away from said slot, means connecting said pin and said hub member for axially moving the two together, and a linkage member connected to said bracket and said hub member operable for axially moving the latter to selectively engage or disengage said pin in said slot, thereby connecting or disconnecting, respectively, said drum and shaft for rotation together in a predetermined rotational position.

2. The mechanism of claim 1, which includes a brake member mounted for selective engagement with said drum, said linkage member including means connected to operate said brake member such that the latter is brought into engagement with said drum automatically upon disengagement of said pin and said slot, thereby stopping rotational movement of said drum, and said brake is automatically disengaged with said drum upon engagement of said pin and said slot.

3. The mechanism of claim 2, wherein said linkage member comprises a bell-crank pivoted on said bracket and connected to said hub member, and the means for operating said brake comprises a spring on the bracket normally urging said brake to engage the drum, and a cam on said bell-crank engageable with said brake, whereupon the pivotal movement of the bell-crank in the one direction will move the pin into the slot and move said cam onto the brake, the cam biasing the spring to release the brake, and pivoting the bell crank in the other direction will move the pin out of the slot and release the cam from the brake causing the spring to set the latter.

4. In a glass forming machine timing mechanism including plural timing valves mounted in stationary position, timing valve buttons carried by a rotating timing drum apparatus operated to rotate past said timing valves, the timing valve buttons on said drum effecting operation of the timing valves for operating the forming machine, said drum apparatus comprising a hollow cylindrical drum casting having plural annular grooves for receiving the timing valve operating buttons, a predetermined central timing shaft adapted to be rotated at a constant speed, radical web means in said cylindrical casting providing a journal mounting therefor on said shaft, a stationary bracket, an axially slidable hub member mounted concentric about said shaft, an annular groove formed on the periphery of said hub, an axially shiftable pin, a pin-carriage member defining an axial slideway for said pin, means for adjustably mounting the pin-carriage member in a preselected rotational position interiorly on said cylindrical casting, a lug on said pin carried in said annular groove of the hub member, a flywheel fastened on said shaft for rotation therewith and defining a radially disposed slot radially aligned to receive and drive said pin, an eccentric member pivoted on said stationary bracket, a pivotal linkage connecting the eccentric member and said hub member, and means connected to said eccentric member for rotating it in either direction to move the pin toward and away from said flywheel slot thereby engaging and disengaging the pin and the slot and for effecting selective rotation of the drum and the shaft in a predetermined rotational position.

5. The apparatus defined by claim 4, wherein is included an annular slide attached to said bracket and journaled on said shaft, the axially slidable hub member being concentrically mounted on said annular slide.

6. The apparatus defined by claim 4, including a self-acting brake pivoted on said bracket and engageable with said cylindrical drum, means normally setting said brake into braking engagement with said drum, cam means on said eccentric and engageable with said brake during pin engaging rotation of the eccentric, said cam means engaging the brake for pivoting it out of braking engagement responsive to the pin being operated to enter the slot, thereby releasing the brake at the time the drum is connected to the timing shaft for rotation with the latter.

7. The apparatus defined by claim 6, wherein the means normally setting the brake comprises a spring connected between said bracket and said brake for pivoting the brake toward engagement with the drum.

8. The apparatus defined by claim 4, wherein the pin is spring-loaded normally urging movement thereof into engagement with the flywheel.

9. A glass forming machine timing drum apparatus comprising a hollow drum, a central timing shaft mounted for rotation, means on said drum for mounting it on said shaft for rotation with respect to the latter, an axially shiftable pin and ring carriage therefor, adjustable means attaching said ring carriage to said drum and connecting the ring and its said pin for movement with the drum, means fastened on said shaft for rotation therewith and engageable with the pin for imparting driving movement to the drum through the pin, and means connected to the pin for selectively moving it into and out of driving engagement with said last-mentioned means, thereby controlling rotational operation of said drum by said shaft, the shaft and drum always being engaged at the same rotational position to provide position synchronism.

10. The apparatus defined by claim 9, including a self-acting brake engageable with said drum and operatively connected with said means for selectively moving said pin in controlling the operation of the drum by the shaft, said brake being operated automatically in opposite phase relation with said pin to alternatively (1) effect setting the brake when the drum and shaft are disconnected, and (2) effect unsetting the brake as the drum and shaft are connected.

11. The apparatus defined in claim 4, wherein the means for adjustably mounting the pin-carriage member interiorly on the cylindrical casting comprises a ring, a plug connected to said ring, and a fastening device for detachably securing said plug to the cylindrical casting, thereby providing for rotational adjustment of the ring and its pin the cylinder casting.

12. A timing system for synchronous operation of a glassware forming machine and a glass feeder, the feeder including an overhead means for feeding and controlling the flow of a molten stream of glass and means for severing said stream at intervals to form glass gobs for the forming machine, the timing system comprising a drive transmission connected to operate the glass feeding means and the glass severing means, an electric synchro-tie transmitter motor connected to drive said transmission, a timing drive shaft on the forming machine, a timing drum freely rotatable on said shaft, transmission means connected to said shaft, a synchro-tie receiver motor connected to said transmission means for driving said shaft, means electrically connecting said transmitter motor and said receiver motor for synchronous operation, a clutch means operable for selectively coupling and uncoupling said timing drum to said timing shaft for rotation together, the timing drum and the glass feeding means and glass severing means being thereby synchronized for their co-operating operation in forming glassware articles, the clutch means comprising a drive pin, means adjustable for attaching the latter on the drum in a preselected rotational position and providing for axial movement of the pin parallel to the shaft, a member keyed on said shaft and defining a slot therein for receiving said pin, and means for axially moving said pin for selectively engaging and disengaging it and said slot of the member on the shaft, thereby providing for synchronizing the position of the machine and feeder.

References Cited by the Examiner

UNITED STATES PATENTS

| | | | |
|---|---|---|---|
| 1,911,119 | 5/1933 | Ingle | 65—260 X |
| 2,142,006 | 12/1938 | Schaffer et al. | 65—207 |
| 2,384,498 | 9/1945 | Sloan | 65—158 |
| 2,564,678 | 8/1951 | Dilger | 192—15 X |
| 2,606,476 | 7/1952 | Waller et al. | 192—15 X |
| 2,950,571 | 8/1960 | Wythe | 65—164 |

S. LEON BASHORE, *Acting Primary Examiner.*

DONALL H. SYLVESTER, A. D. KELLOGG,
*Assistant Examiners.*